(12) United States Patent
Bremer et al.

(10) Patent No.: US 8,043,663 B2
(45) Date of Patent: Oct. 25, 2011

(54) PROCESS FOR THE COATING OF OBJECTS

(75) Inventors: Leonardus Gerardus Bernardus Bremer, Vise (BE); Franciscus Victoire Paulus Houtvast, Nuth (NL)

(73) Assignee: DSM IP Assets B.V., Heerlen (NL)

( * ) Notice: Subject to any disclaimer, the term of this patent is extended or adjusted under 35 U.S.C. 154(b) by 680 days.

(21) Appl. No.: 12/067,847

(22) PCT Filed: Sep. 26, 2006

(86) PCT No.: PCT/NL2006/000480
§ 371 (c)(1),
(2), (4) Date: Sep. 9, 2008

(87) PCT Pub. No.: WO2007/035095
PCT Pub. Date: Mar. 29, 2007

(65) Prior Publication Data
US 2011/0097502 A1    Apr. 28, 2011

(30) Foreign Application Priority Data
Sep. 26, 2005  (NL) ..................................... 1030032

(51) Int. Cl.
*B05D 1/36* (2006.01)
(52) U.S. Cl. ................... 427/402; 427/419.5; 427/419.8
(58) Field of Classification Search .................. 427/402, 427/419.5, 419.8
See application file for complete search history.

(56) References Cited

U.S. PATENT DOCUMENTS

| 4,517,246 A | 5/1985 | Matsuyama et al. |
| 4,960,617 A | 10/1990 | Chatterjee et al. |

FOREIGN PATENT DOCUMENTS

| WO | 03/087198 | 10/2003 |
| WO | WO 03/087198 | * 10/2003 |

OTHER PUBLICATIONS

International Search Report dated Nov. 17, 2006.
Written Opinion of the International Searching Authority dated Nov. 17, 2006.

* cited by examiner

*Primary Examiner* — Eisa Elhilo
(74) *Attorney, Agent, or Firm* — Nixon & Vanderhye P.C.

(57) ABSTRACT

Process for the coating of objects, comprising contacting the objects with a composition comprising an additive, a film-forming binder and optionally a distributing agent, at a temperature below the softening temperature $T_p$ of the objects and at a temperature at which the binder can form a film, forming and consolidating an additive-containing layer of binder on the surface of the objects, the objects being kept in mutual motion while they are being contacted with the composition and while the additive-containing layer of binder is being formed and consolidated, which process is carried out in a container bounded by walls of which the temperature of the walls is so much lower than the application temperature that formation of a film of the binder on the walls is prevented.

13 Claims, 1 Drawing Sheet

PROCESS FOR THE COATING OF OBJECTS

This application is the U.S. national phase of International Application No. PCT/NL2006/000480 filed 26 Sep. 2006 which designated the U.S. and claims priority to NL 1030032 filed 26 Sep. 2005, the entire contents of each of which are hereby incorporated by reference.

FIELD

The invention relates to a process for the coating of objects, comprising the contacting of the objects with a composition that comprises an additive, a film-forming binder and optionally a distributing agent, at an application temperature that is below the softening temperature $T_p$ of the objects and at a temperature at which the binder can form a film, and the formation and consolidation of an additive-containing layer of binder on the surface of the objects.

BACKGROUND AND SUMMARY

A process for the coating objects is known from WO 03/087198, in which a solution or dispersion of the additive and the binder are contacted with the polymer particles by spraying the dispersion, for instance via a nozzle or with the aid of a propellant. After that, a liquid is sprayed that has a cleaning effect on the spraying system in the presence of the plastic pellets.

The drawback of this process is that a portion of the composition ends upon the wall and is deposited on any parts of equipment present in the space in which the composition is sprayed. This makes it necessary to repeatedly clean the space in which spraying takes place. This holds in particular when batches with different additives are consecutively processed. In that case, cleaning must take place after each change of additive.

The aim of the invention is to provide a process for the coating of objects that to a significant extent prevents fouling of the space in which coating takes place.

This aim is achieved according to the invention in that the objects are kept in mutual motion while they are being contacted with the composition and while the additive-containing layer of binder is being formed and consolidated and that the process is carried out in a container bounded by walls of which the temperature is so much lower than the application temperature that the formation of a film of the binder on the walls is prevented.

It has been found that the walls, by keeping them at a temperature that is lower than a temperature at which formation of a film of the binder on the wall is prevented, are not fouled but that any deposits of the composition on the walls do not adhere to the walls and are readily taken up again by the moving particles when they come into in contact with the walls. This effect is achieved at any rate when the temperature of the walls is below the minimum temperature at which the binder can form a film. However, in many cases this requirement is unnecessarily restrictive and often it will suffice to keep the walls at a temperature that is lower than the dew point of the optional distributing agent during application and consolidation. Under those conditions a certain degree of condensation of the distributing agent on the colder wall surface will take place so that drying in of the composition on the wall is prevented. As a result, a large number of batches of objects can be coated with the same additive without intermediate cleaning, and it has even found to be possible to do without cleaning also when there is a change of additive.

With the process according to the invention it is possible to coat objects of random shape and of any material that is resistant to a temperature that is higher than the minimum temperature at which the binder to be used can form a film. The process is most suitable for the coating of objects without cavities or protruding parts, such as for instance seeds, pills and pellets. Such objects can be processed below the temperature at which degradation, decomposition and other undesirable changes in their properties start to occur. As softening temperature $T_p$ of the polymer use is made of the glass transition temperature for amorphous polymers and of the melting point, determined by means of DSC with a heating rate of 10° C. per minute, for semi-crystalline and crystalline polymers.

DETAILED DESCRIPTION

Figure 1:
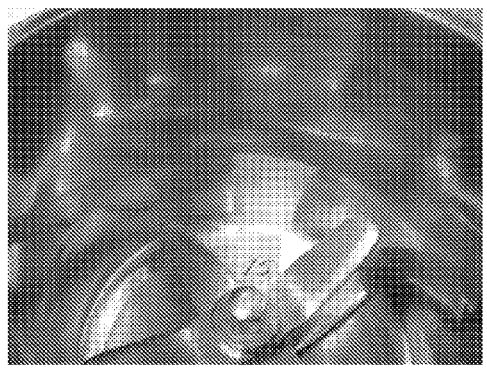
FIG. 1 is a photograph of the internal surface of a Henschel mixer employed in Example 1 below wherein the mixer was cooled during the coating process.

Below, the invention will be elucidated on the basis of the example of coating of polymer particles, in particular polymer pellets. One skilled in the art is able to translate this, mutatis mutandis, to the coating of objects of other materials.

Consolidation of the mixture of binder and additive is here understood to mean bringing the layer of the mixture on the particles in such a condition that they no longer stick together and the layer no longer comes off on the walls.

If no distributing agent is present is in the mixture, consolidation may for instance be effected by cooling the binder to below its softening temperature $T_b$ or by reactions taking place in the binder, for instance polymerization. This can be realized, after the time needed to effect uniform distribution of the binder-additive mixture over the particles, by lowering the temperature in the container, for instance by blowing in of cooling gas, for instance air or nitrogen. Cooling of the particles can also take place as a result of the contact with the colder wall.

If a distributing agent is present in the mixture, consolidation can be effected by evaporation of the distributing agent, which generally causes the softening temperature of the binder-distributing agent mixture to increase, possibly in combination with or followed by the above-mentioned measures for consolidation of the binder if no distributing agent is present.

The binder can be dispersed or emulsified or also dissolved in the distributing agent. The glass transition temperature of the binder in the mixture or solution will generally be lower than that of the binder, $T_b$, by itself. Upon removal of the distributing agent the actual $T_b$ will increase to the $T_b$ of the binder itself when the entire distributing agent has been removed. It has been found that the presence of a small amount of distributing agent or solvent in the binder is already sufficient to reduce the $T_b$. This makes it possible to still use binders having a $T_b$ that is higher than the $T_p$ of the material to be coated.

The distributing agent can also serve as solvent for the binder.

The process is carried out a temperature at which the binder can form a film. This temperature can be determined for each binder, whether or not mixed with a distributing agent, according to ASTM standard D2354. Equipment needed for carrying out this test method is commercially available, for instance the MFFT Bar of Rhopoint Instruments Ltd.

It has been found that at such a temperature the binder or the binder-distributing agent combination is uniformly spread out over the particles to be coated when they come into contact with each other and an additive-containing binder film is formed.

An added advantage of the process according to the invention is that the composition supplied entirely ends up on the particles. This enhances the reproducibility of the process as it is more predictable how much additive ends up on the particles when there is no unpredictable portion of the additive remaining behind on the wall instead of ending up on the particles.

The specific choice of the temperature during coating in combination with the keeping the particles in mutual motion appears to result in very homogeneous coating of these particles. It is assumed that this is a consequence of the fact that the binder, also when a large portion of the distributing agent has evaporated, still flows and remains suitably deformable and that the collisions between the pellets caused by their mutual motion result in uniform distribution of the additive-containing binder, both between the particles and over the surface of the individual particles.

Preferably the temperature during removal of the distributing agent is at least 5° C. below $T_p$. This ensures in particular that the polymer particles retain their shape and firmness so that upon the mutual contacts of the particles, which occur as a result of their mutual motion, sufficient force is exerted on the softer binder-containing composition for uniform distribution of the latter over the outer surface of the polymer particles.

It is also preferred for the temperature during removal of the distributing agent to be at least 5° C. above the minimum film-forming temperature but to be lower than $T_p$. This ensures that, also when the greater part of the distributing agent has been removed and the viscosity of the binder starts to play an important role in the distribution of the composition over the surface of the polymer particles, the binder is soft enough to be regularly distributed over the surface of the particles by the forces that occur upon the mutual contacts between said particles while the particles are being kept in mutual motion.

While the particles are thus being kept in mutual motion, they will come into contact with the walls and leave mixture on them. Due to the temperature of the walls being low relative to the particle temperature and the space temperature, which in principle are the same, it is found that the mixture does not adhere to the walls but is readily taken up by subsequent particles colliding against the wall. After some time the mixture is found to have been distributed uniformly over the particles while less material is coming off on the wall. During this distribution process the temperature must remain above the lowest film-forming temperature of the binder for a sufficiently long time to ensure full and uniform distribution of the mixture over the particles. In this process, a portion of the distributing agent will also already evaporate, leading to a decrease in the temperature of the particles. If the amount of heat present in the particles is insufficient to keep the temperature of their surface above the desired film-forming temperature, extra heat can be supplied by blowing in hot gas, for instance air or nitrogen. This also keeps the temperature difference between wall and particles, including the space around it, high, which promotes condensation of distributing agent on the wall. This is favourable since the presence of a liquid film on the wall prevents adhesion of the mixture to the wall.

Evaporation of the distributing agent in many cases appears to lead to the desired consolidation but if desired this can be promoted by starting to blow cold air into the container as from a certain moment so as to effect consolidation through cooling to below the binder's softening temperature.

In all cases the evaporated distributing agent is gradually discharged from the container. This is accompanied by gradual drying in of the mixture and formation of a film on the particles that no longer comes off on the wall while it does continue to take up impurities from the wall.

It has been found that, in the course of the process as described, depositing of binder-additive mixture on the walls does take place during the time that the particles and space temperature is above the film-forming temperature, but that the deposited material is subsequently taken up by the particles colliding against the wall, but during consolidation due to film formation and distributing agent evaporation and afterwards the binder mixture adheres so strongly to the particles that the release of material to the wall decreases to zero or virtually zero. As a result, at the end of the process the walls are entirely or almost entirely free of fouling with (fractions) of the mixture applied and the container can without intermediate cleaning be reused for coating of a subsequent quantity of particles, or for applying a subsequent layer on the same particles.

The latter is particular advantageous since it makes it possible to apply any desired colour composition to particles by coating the objects with a number, for instance 2-5, of compositions that each contain the desired quantities of one basic colour. In the process according to the invention these all end up entirely on the particles, without any material being lost on the walls. The different compositions can be applied in one operation by simultaneously supplying the different compositions from various feeds, but it is also possible to supply the different compositions consecutively. Carried out in this way, the process does away with the need for a mixer, as it does with the need for cleaning of this mixer for every change of colour mixture.

If desired a topcoat, in which no additive is present, can additionally be applied as subsequent layer. Should any fouling still be present on the wall, this will then be removed.

The times needed at the set temperature for the described phases of the process can readily be determined by trial and error.

To promote good cleaning of the wall, it is advantageous for the entire wall to come into contact with the moving particles. This can for instance be achieved by a suitable combination of filling degree and mode of keeping the particles in mutual motion. At a lower filling degree, more intensive keeping in motion is required than at a high filling degree. In case of incomplete contact at a certain level for instance a fouled edge may be formed or spatters of the composition may land above a level to which the particles come into contact with the walls.

A very suitable way of keeping the particles in motion during the coating process is by means of stirring gear, with the stirring gear also being kept at a temperature below the minimum temperature at which the binder can form a film or below the dew point of the distributing agent, as described above for the walls. The temperature of walls and any stirring gear is preferably above the freezing point of the distributing agent.

Thus, also the stirring gear is found to remain clean and a next batch of polymer pellets can be coated without the equipment having to be cleaned in between and without inadmissible contamination of this batch with polymer, binder or additive residues from the previous batch occurring.

It is also possible to apply stirring gear that can readily be changed. Possible contamination will then take place only on the stirring gear. After replacing it with clean gear, the equipment is ready for use again. The stirring gear can then be cleaned off-line while the installation remains in operation.

In the process according to the invention objects, in particular, polymer particles are coated. These particles can and will as a rule be pellets, as used as feed for extruders and other polymer-processing equipment, but if desired also larger particles or even objects can be coated with the process according to the invention. Examples of suitable polymers that, often mixed with additives, are processed are thermoplastic polymers such as polyolefins, polyesters, polyamides, polycarbonate, acrylonitrile-butadiene-styrene polymer, polyacetals and polystyrene.

The polymer particles are contacted with a composition comprising an additive, a film-forming binder, which is compatible or preferably miscible with the polymer in case of melt processing of the polymer, and a distributing agent. Compatible is understood to be such a miscibility with the polymer that upon melt processing of the coated polymer the applied layer is homogeneous with it, that is, without essentially changing in an unacceptable way the properties thereof other than is intended with the addition of the additive.

The process is suitable for the customary additives, examples of which are colorants, lubricants, blowing agents, pigments, dyes, antioxidants, thermal and UV-stabilizers, antistatics, anti-blocking agents, release agents and flame-retardants. The process is particularly suitable for coating with colorants such as pigments and dyes since uniform distribution of these in the coating is very important for obtaining uniformly coloured objects when the polymer particles are processed. In the composition one or more additives may be present.

Suitable film-forming binders are those substances from which a coherent thin layer can be obtained by solution, dispersion or melt processing. Examples are oligomers and polymers.

The composition contains a distributing agent. The distributing agent is chosen so, in conjunction with the binder and the additive or additives, that these components can form a stable dispersion therein, if desired with the application, known by itself, of a dispersing agent. Preferably no or a minimal amount of dispersing agent is added, because its presence in the coating of the polymer particles may have un undesirable influence on the properties of the polymer in the particles and on those of the objects eventually made from these. To minimize the optionally required quantity of a dispersing agent it is advantageous for the binder to possess lyophilic groups.

The quantities of binder and additive that are contacted via the composition with a certain quantity of polymer particles are chosen so that the coating of the polymer particles has a desired thickness and a desired additive and binder content. In practice, the proportion of the sum of additive and binder relative to the total of additive, binder and polymer particles lies between 0.001 and 5 wt. % and preferably between 0.001 and 1 wt. %. The lower limit is determined by the minimally desired proportion of additive, while the upper limit is determined by the maximum allowable amount of binder in connection with its possible adverse influence on the polymer's properties. The binder:additive ratio as a rule lies between 1:10 and 10:1, with the relative amount of binder preferably being limited to what is necessary for realizing good encapsulation of the additive in the coating layer and adequate dispersion of the additives after processing of the polymer. As a rule, ratios around 1:1 suffice.

Since the coating layer thickness will typically be between 1 and 10 µm at the defined proportion of the coating relative to the polymer and at a customary pellet size of 0.5 to 5 mm, the size of at least 90% of the additive particles in the coating is preferably lower than 10 µm and more preferably lower than 5 µm. If the additive particles do not dissolve in the distributing agent, the additive is preferably added to the distributing agent in the desired size.

For objects from other materials as a rule only the desired layer thickness of the coating is the decisive factor, so that the required quantities of binder and additive can simply be calculated from the total area to be coated and the desired layer thickness.

Due to the mechanical effect of the mutual contacts between the polymer particles as a result of their mutual motion the composition will be spread out over the surface of the particles. This results in the formation of a layer of additive-containing binder, which since this spreading takes place at a temperature above the binder's film-forming temperature, changes into the desired additive-containing film. If the additive does dissolve in the distributing agent bigger particles can be started from, which will as a result of dissolution automatically be reduced in size or even be reduced to molecular level. In that case, the size of the binder particles in the composition can be chosen within wider limits than in case of a non-dissolving additive. An upper limit is defined by the requirement that the binder particles must form a stable dispersion in the distributing agent, optionally with the use of an allowable quantity of dispersing agent. Another requirement, which as a rule is less strict, is imposed by the size of the polymer particles. To achieve effective spreading of the binder above its minimum softening temperature over the polymer particles, the size of the binder particles is preferably at most 50% and more preferably at most 30% of the size of the polymer particles.

If the binder is soluble in the distributing agent, bigger binder particles can be used in the composition for the reasons stated above for the additive.

The binder is preferably inert relative to the additive, so that the additive still possesses the desired properties in the coating. Binder and additive may be separately present in the composition but it is also possible for the additive to have already been incorporated into the binder. The latter is advantageous because as a rule then less dispersing agent is needed for obtaining a stable dispersion in the composition and a reduction of the required quantity of distributing agent becomes possible.

The composition is contacted with the polymer particles, removal of the distributing agent resulting in a layer of additive-containing binder being formed on the particles. This contacting can for instance take place by pouring or spraying the composition over the particles in a container or by otherwise moistening the particles with the composition. This can be done in steps, with each time a portion of the composition being supplied to the particles and, after removal of the distributing agent, for instance through evaporation, a next portion and so on until the total quantity of composition has been supplied. The particles can already have been given the desired temperature before being contacted with the composition, the heat present in the particles causing evaporation of the distributing agent. In addition, extra heat can be supplied, for instance by means of hot air or inert gas or by heat radiation, to accelerate evaporation.

After they have been contacted, or already during contacting, with the composition and during removal of the distributing agent the particles are kept in mutual motion, with the particles also being contacted again and again with that portion of the composition, this being a liquid, that may have dripped off from the particles. In this way the total composition and the quantities of additive and binder present in it is applied to the particles, while moreover sticking together of the particles is prevented. The composition present on the particles can be sticky on account of the presence of a quantity of distributing agent that is still larger than allowable and on account of the presence of the binder at a temperature above its softening temperature.

One of the steps in the process according to the invention is the consolidation of the additive-containing binder layer on the pellets. This is understood to mean that the stickiness of this layer is reduced to such an extent that the pellets adhere to one another at most with such a small force that a small mechanical load such as shaking or stirring will cause them to separate. Such a small mechanical load may for instance be the pouring into or out of a packaging or the filling of a storage drum or the discharge from it.

This consolidation can take place in the container in which the composition has been applied, but it is also possible to transfer the particles to another space. The keeping in motion of the particles is stopped only when the binder layer has been consolidated. After that, the coated particles can be removed from the space in which coating has taken place.

The mutual adherability of the coated particles can be reduced in several ways during the process. One possibility is evaporation of so much of distributing agent that the softening temperature of the binder composition used becomes higher than the temperature of the pellets. Another possibility is to reduce the temperature of the pellets to below the softening temperature of the binder composition. If the binder is soluble in the polymer, the polymer of the particles will partly start to dissolve in the binder so that the softening temperature of the binder will rise. In another embodiment use is made of a reactive binder of which the adherability improves due to polymerization occurring between binder molecules or between binder molecules and the polymer.

Depending on the method chosen to consolidate the layer, the distributing agent is removed before, during or after said consolidation. A contribution to said removal is made by the increased temperature at which the composition is contacted and by the optional gas or air stream with which the composition is supplied or with which optionally a fluid bed is maintained.

The particles can be kept in motion in known ways. Examples are the maintaining of a fluid bed, with air or an inert gas, if desired heated to the chosen temperature, being blown through the particles from the bottom upward. Together with the air optionally also the composition used for coating can be supplied, but this composition can also be supplied separately from the top or from the side. Preferably the particles are kept in motion by means of stirring gear, which is then preferably cooled to a temperature below the minimum temperature at which the binder can form a film.

When a consolidated layer of the binder with the additive in it has formed on the particles, this layer may still have some tendency to bond the particles to each other. As a rule, however, the particles then no longer come off on smooth surfaces (metal, glass or ceramics) of the equipment.

After the stickiness of the particles has decreased to an acceptable level, for instance according to one of the abovementioned ways, the keeping in motion can be stopped and the temperature can be reduced. It has been found that stopping of the mutual motion when the temperature has dropped to the region of $T_b$, for instance to about 5° C. above it, only leads to such mild mutual sticking that a minor mechanical load, for instance shaking or gentle stirring, is enough to separate the particles again. This is even the case when the binder layer still contains at most 10, 5 or 2 wt. % of the solvent. The allowable temperature and moisture content depend on the combination of distributing agent and binder but can simply be determined experimentally.

As softening temperature $T_b$ of the binder the glass transition temperature is used if the binder is an amorphous polymer and preferably the melting temperature if the binder is a semi-crystalline or crystalline polymer. If the binder dissolves in the distributing agent the temperature at the start should be above the dissolution temperature of the binder in the distributing agent. As the distributing agent is being removed, the increase in concentration will cause this dissolution temperature to increase and at a certain minimum concentration the binder's glass transition temperature or melting point will become decisive. When use is made of a solution of the binder in a distributing agent, the temperature of the particles will therefore always have to be higher than the temperature that is relevant at that moment in order to keep the binder in a condition that allows of spreading and distribution over the moving particles. At the start of the distributing agent removal process this is the dissolving temperature, and at the end it is the said softening temperature.

Until virtually all of the composition has been applied as a layer on the particles, the temperature of the surface of the particles will have to be kept above the minimum film-forming temperature.

The binder is selected in such a way that it can still be mixed homogenously with the polymer in a melting process after coating application. Preferably the binder therefore is a thermoplastic polymer and no or only little crosslinking takes place during the coating process.

The binders are selected in conjunction with the polymer of the particles and meet the requirement that they are miscible with this polymer. In addition, the binder, as already stated before, must be capable of forming a film while it should not have any undesirable influence on the additive to be applied, either.

Examples of suitable binders for application of an additive-containing coating with the process according to the invention on polyamides, polyesters and polyethers are various types of polyvinyl pyrrolidones or polyvinyl caprolactam such as Luvitec and Luvicap (®, of BASF), polyoxazolines such as Aquasol® of Polymer Innovations Inc. and resins prepared by polymerization of monomers with two reactive groups chosen from: alcohols, carboxylic acids, amines or isocyanates. At least a part of the monomers applied should have sufficient affinity for the distributing agent to enable emulsification or dissolution of the binder. Suitable examples of such binders are polyethers such as polyethylene oxide, polypropylene oxide and combinations of these. It is also possible to add after the polymerization substances that have affinity for both the resin and the distributing agent. Examples are block copolymers with a polyethylene oxide block. This has affinity for water, which is a distributing agent that is to be preferred. By using isocyanates it is possible to have the polymerization take place only partially by blocking off these groups. This has the advantage that the binder is of lower molecular weight when being applied and is thus easier to distribute over the pellets but able to polymerize further after coating and even enter into bonds with the coated polymer as a result of which mixing improves and the pellets are no longer sticky. In particular polyvinyl pyrrolidone with water as distributing agent appears to perform very well in combination with polyamide 6.

Neoxil 0010® (DSM) has been found to be particularly suitable for the coating of polycarbonate pellets and differently shaped objects thereof. After processing of pellets coated with this, the polymer is found to have fully retained its clarity.

Suitable binders for application of an additive-containing coating using the process according to the invention on polyolefins are emulsions of modified polyolefins, preferably oxidized or grafted with lyophilic groups, EVA or PVA, optionally mixed with emulsions of polyester, polyurethane or epoxy resins, such as for instance obtainable under the Neoxil® brand name (DSM) to obtain a better mechanical strength of the coating. Emulsions of LLDPE are also suitable because this material has a lower melting point than most other polyolefins. Also suitable are binders that can be prepared by means of emulsion polymerization, such as polystyrene and polybutadiene latexes. These have the added advantage that they already contain a distributing agent, so that no extra step is needed to prepare suitable binder dispersion. Addition of a wetting agent such as one of the Silwet® additives (Crompton) or one of the additives of Byk Chemie, forming part of the group Byk 331 through 348, gives better wetting of the pellets upon application of hydrophobic polymers such as polyolefins or styrene polymers.

Styrene polymers such as polystyrene, HIPS, ABS can be coated with the same binders as polyolefins, but also with sulphonated polystyrene and styrene-maleic anhydride copolymers that are soluble or dispersible in water, optionally after addition of a base for neutralization of acid groups. At processing temperatures below 300° C. polyvinyl alcohol is a suitable binder.

The invention will be illustrated by the following examples without being restricted thereto.

Example 1

A Piovan hopper dryer is filled with 25 kg Xanthar PC 24R polycarbonate and heated to 140° C. After this temperature was reached 12 kg of the hot polycarbonate was released in a Henschel mixer of 40 liters. The mixer was closed, started at 850 RPM the minimum stirring speed, and a coating dispersion was injected immediately after starting the mixer. A small flow of nitrogen was blown in the mixer. The internal surface of the mixer was cooled with cooling water.

The coating dispersion was prepared by mixing 100 grams Neoxil 0010 binder emulsion (DSM Resins), 20 grams colorant and 5 grams water for reducing the viscosity of the paste. The colorant used in this experiment is Macrolex Yellow 6G.

After injection of the coating dispersion in 10 seconds, the mixing was continued for 60 seconds and subsequently the valve was opened and the coated pellets were collected in a metal container. After the injection of the coating dispersion steam could be observed leaving the mixer through the holes that are used for injection of the dispersion and for entering the tube with nitrogen. The pellets had a temperature of about 40° C. when leaving the mixer.

As shown in FIG. 1, the internal surface of the mixer appeared clean and only the impeller had significant deposit of colorant. This deposit can easily be removed with water.

Comparative Experiment A

Figure 2:
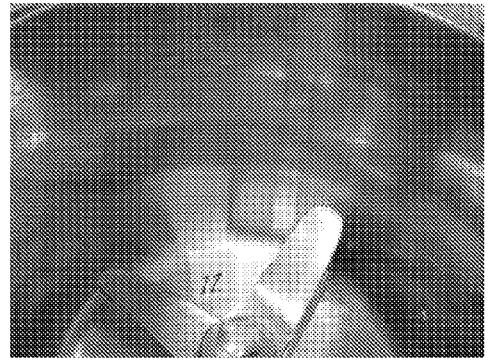
FIG. 2 is a photograph of the internal surface of a Henschel mixer employed in Comparative experiment A below.

The same experiment as described in example 1 has been repeated in a heated Henschel mixer (70° C.). The pellets were again coated but this time the internal mixer was not cooled and the coated pellets were still hot after leaving the mixer (about 80° C.). As shown in FIG. 2, the internal surface of the mixer appeared yellow due to deposit of the colorant. Also the impeller was fouled.

Comparative Experiment B

Figure 3:
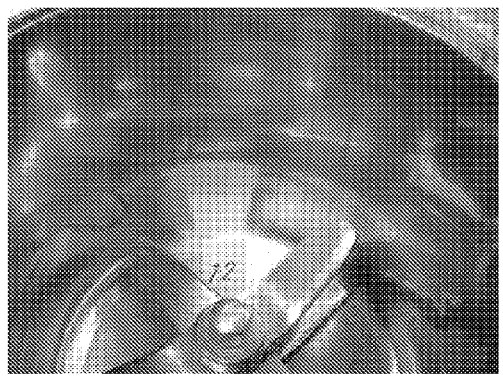
FIG. 3 is a photograph of the internal surface of a Henschel mixer employed in Comparative experiment B below.

The process of example 1 has been repeated but with only 4 kg Xanthar PC 24R polycarbonate. As shown in FIG. 3, the upper part of the mixer and the lid were covered with yellow spatters and drops.

Comparative Experiment C

Figure 4:
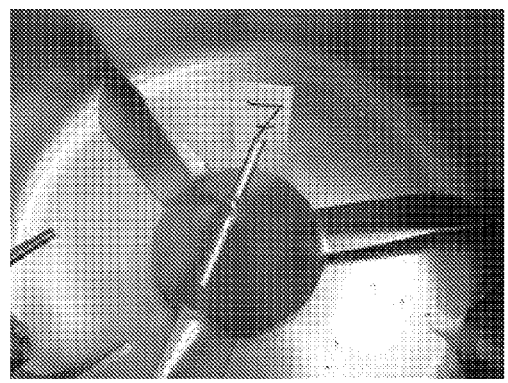
FIG. 4 is a photograph of the internal surface of a Henschel mixer employed in Comparative experiment C below.

Another mixer having a small clearance between the impeller and the bottom of the vessel has been used on the same experiment as in example 1. As shown in FIG. 4, a yellow ring is observed at the bottom of the vessel.

The invention claimed is:

1. Process for the coating of objects, comprising
   contacting the objects with a composition comprising an additive, a film-fanning binder and optionally a distributing agent, at a temperature below the softening temperature $T_p$ of the objects and at a temperature at which the binder can form a film,
   forming and consolidating an additive-containing layer of binder on the surface of the objects, the objects being kept in mutual motion while they are being contacted with the composition and while the additive-containing layer of binder is being formed and consolidated, which process is carried out in a container bounded by walls of which the temperature of the walls is so much lower than the application temperature that formation of a film of the binder on the walls is prevented.

2. Process according to claim 1, in which the walls have a temperature that is lower than the minimum temperature at which the binder can form a film.

3. Process according to claim 1, in which the temperature of the walls is lower than the dew point of the optional distributing agent during application and consolidation.

4. Process according to claim 1, in which the objects are polymer particles.

5. Process according to claim 1, in which consolidation takes place by removing the distributing agent to the point at which the softening temperature of the binder in the composition has increased to above the particle temperature.

6. Process according to claim 1, in which the particles are kept in mutual motion by means of stirring gear, of which the temperature is kept below the minimum film-forming temperature of the binder.

7. Process according to claim 1, in which the particle temperature during removal of the distributing agent is at least 5° C. lower than $T_p$.

8. Process according to claim 1, in which the particle temperature during removal of the distributing agent is at least 5° C. above the minimum film-forming temperature of the binder but lower than T.

9. Process according to claim 4, in which the proportion of the sum of additive and binder relative to the total of additive, binder and polymer particles lies between 0.001 and 5 wt. %.

10. Process according to claim 1, in which the binder is soluble in distributing agent.

11. Process according to claim 1, in which the additive is incorporated in the binder and the binder is insoluble in the distributing agent.

12. Process according to claim 4, in which the objects are coated with a number of compositions that each contain one basic colour as additive.

13. Process for the preparation of additive-containing polymeric objects, in which polymer particles coated according to the process of claim 1 are processed at a temperature above the melting point of the polymer.

* * * * *